US011202060B2

(12) United States Patent
Boev et al.

(10) Patent No.: US 11,202,060 B2
(45) Date of Patent: Dec. 14, 2021

(54) DEVICE AND METHOD FOR PRE-COMPENSATING A FAST TUNABLE LENS

(71) Applicant: Huawei Technologies Co., Ltd., Shenzhen (CN)

(72) Inventors: Atanas Boev, Munich (DE); Hector Navarro Fructuoso, Munich (DE); Panji Setiawan, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/791,885

(22) Filed: Feb. 14, 2020

(65) Prior Publication Data

US 2020/0186785 A1 Jun. 11, 2020

Related U.S. Application Data

(63) Continuation of application No. PCT/EP2017/070615, filed on Aug. 14, 2017.

(51) Int. Cl.
*H04N 13/322* (2018.01)
*G02B 3/14* (2006.01)
*H04N 13/332* (2018.01)

(52) U.S. Cl.
CPC ............. *H04N 13/322* (2018.05); *G02B 3/14* (2013.01); *H04N 13/332* (2018.05)

(58) Field of Classification Search
None
See application file for complete search history.

(56) References Cited

U.S. PATENT DOCUMENTS

| 2012/0169902 | A1 | 7/2012 | Matsuzawa et al. |
| 2016/0147078 | A1* | 5/2016 | Bedard ................ G02B 25/001 345/6 |
| 2018/0088440 | A1* | 3/2018 | Gladnick ................. G02B 7/32 |
| 2018/0239145 | A1* | 8/2018 | Lanman .................. G06F 3/013 |

FOREIGN PATENT DOCUMENTS

| CN | 101060636 A | 10/2007 |
| CN | 102045498 A | 5/2011 |
| WO | 2017098568 A1 | 6/2017 |

OTHER PUBLICATIONS

Diederich et al., "Characterization of electrical tuneable lenses and their applications," Master Research Seminar Proceedings 2015—Department AOE, XP055467208, 8 pages (Jan. 30, 2016).

(Continued)

*Primary Examiner* — Stuart D Bennett
(74) *Attorney, Agent, or Firm* — Leydig, Voit & Mayer, Ltd.

(57) ABSTRACT

A multifocal display device has a focus tunable lens (FTL) and a controller configured to shift a focus of the FTL from a first focal plane to a second focal plane by applying a compensated control signal to the FTL. The controller is configured to generate a current compensated control signal value, which is a value of the compensated control signal for a current point in time, based on one or more previous compensated control signal values, which are values of the compensated control signal at one or more previous points in time.

15 Claims, 5 Drawing Sheets

(56) References Cited

OTHER PUBLICATIONS

"DLP Technology for Near Eye Display—White Paper," Texas Instruments Incorporated, 18 pages (Sep. 2014).
Kramida, "Resolving the Vergence-Accommodation Conflict in Head-Mounted Displays," IEEE Transactions on Visualization and Computer Graphics, 22(7): 1912-1931, Institute of Electrical and Electronics Engineers—New York, New York (Jul. 2016).
Lambooij et al., "Visual Discomfort and Visual Fatigue of Stereoscopic Display: A Review," Journal of Imaging Science and Technology, 53(3): 030201-030214, Society for Imaging Science and Technology (2009).
Hu et al., "Design and Assessment of a Depth-Fused Multi-Focal-Plane Display Prototype," Journal of Display Technology, 10(4): 308-316, Institute of Electrical and Electronics Engineers—New York, New York (Apr. 2014).
Wu et al., "Content-Adaptive Focus Configuration for Near-Eye Multi-Focal Displays," Institute of Electrical and Electronics Engineers—New York, New York Intl. Conf, on Multimedia and Expo (ICME), pp. 1-6 (Jul. 2016).
Narain et al., "Optimal Presentation of Imagery with Focus Cues on Multi-Plane Displays," ACM Trans, on Graphics, 34(4): 1-12 (Aug. 2015).
"Fast Electrically Tunable Lens, EL 10-30 Series," Datasheet: EL-10-30-Series, Optotune, pp. 1-16 (Jan. 2017).
Shibata et al., "The zone of comfort: Predicting visual discomfort with stereo displays," J. Vis., 53 pages (Jul. 2011).
"TI training and videos >(I), Applications and designs," 2 pages, Retrieved from the internet:http://www.ti.com/general/docs/video/watch.tsp?entryid=5157963226001 on Mar. 18, 2020.
Sommerich, "How DLP works"—Tutorial, in AV Asia Pacific Magazine, pp. 64-65 (2009).
"Principles of Time Domain Imaging," 19 pages, Forth Dimension Display Limited, United Kingdom (Dec. 2013).

\* cited by examiner

DEVICE AND METHOD FOR PRE-COMPENSATING A FAST TUNABLE LENS

CROSS-REFERENCE TO RELATED APPLICATIONS

This application is a continuation of International Application No. PCT/EP2017/070615, filed on Aug. 14, 2017, the disclosure of which is hereby incorporated by reference in its entirety.

FIELD

The present disclosure relates to a device and a method for controlling a fast tunable lens.

BACKGROUND

Multi-focal-plane near eye displays (MFD) have recently emerged to be one of the preferred practical means of alleviating visual discomfort in viewing 3D content with a head mounted display and thus providing true volumetric 3D rendering. Conventional near eye displays (NED) are based on stereoscopic 3D displays by rendering depth perception of 3D scenes from pairs of 2D perspective images with binocular disparities presented at a fixed distance (focal plane) to the viewer. This creates an unnatural viewing condition due to the Vergence-Accommodation Conflict (VAC) with adverse consequences, e.g. visual discomfort and fatigue or distorted depth perception.

Multiple carefully placed, discrete focal planes divide an extended 3D scene volume into multiple zones along the visual axis. Virtual objects within a zone are rendered by the corresponding pair of adjacent focal planes such that the 2D perspective images of these objects are displayed at a nearly correct focal distance.

MFD implementations can be categorized into spatially multiplexed or temporally/time multiplexed techniques. In the time multiplexed systems, the viewing distance of a single 2D display from the eye is rapidly switched in synchronization with the rendering of frames of multiple focal planes to create a flicker-free perception. In order to perform the focal plane switching high-speed Focal Modulator Elements utilizing variable power lenses or focus tunable lenses are employed to continuously adjust/modulate the focal length or optical power of, e.g., electrically tunable lens or deformable membrane mirror devices (DMMD). A focal modulator element, such as an electrically focus tunable lens (FTL), is a shape-changing lens. It consists of a container, which is filled with an optical fluid and is sealed off with an elastic polymer membrane. The current flowing through the coil of the actuator is used to control the deflection of the lens or the focal distance of the lens. To generate several optical powers (e.g., 4 focal planes), a control signal in the form of current steps representing according current levels are applied.

However, at present, the described display system suffers from artifacts mainly related to the Focal Modulator Elements as illustrated in FIG. 2 as highlighted in "*Datasheet: EL*-10-30-*Series, Fast Electrically Tunable Lens, Optotune, Jan* 2017". Due to lens inertia, an oscillation artifact (overshoot+ringing) appears in the optical response, which is characterized by the rise time and settling time.

The problem has mainly been solved by applying some pre-processing methods to enhance the optical and frequency responses of power lenses as highlighted in "*Datasheet: EL*-10-30-*Series, Fast Electrically Tunable Lens, Optotune, Jan* 2017". In order to achieve a shorter settling time, it is suggested therein to remove resonance frequencies from the applied step function and by applying an overshooting step function. However, these measures are insufficient to guarantee a high quality MFD system deployment.

SUMMARY

In view of the above-mentioned problems and disadvantages, the present disclosure provides improvements to the conventional techniques. The disclosure provides improvements to the optical response of a fast tunable lens, especially for fast tuning sequences. The optical response of the FTL is the optical power (or, equivalently, the focal length or the position of the focus) of the FTL that results from applying the control signal (e.g., an electrical current) to the FTL.

An insight of the present disclosure includes generating and applying an optimal lens control signal, which compensates a "real" oscillating optical response at an FTL due to a present focal plane change by also considering the compensation of previous focal plane changes that also contribute to the present, undesirably oscillating optical response at the FTL.

A first aspect of the present disclosure provides a multi-focal display device, which includes a focus tunable lens, FTL, and a controller. The controller is configured to shift a focus of the FTL from a first focal plane to a second focal plane by applying a compensated control signal to the FTL. The controller is configured to generate a current compensated control signal value, which is a value of the compensated control signal for a current (i.e. present) point in time, based on one or more previous compensated control signal values, which are values of the compensated control signal at one or more previous points in time.

Generating the compensated control signal in this manner can reduce or avoid undesirable overshoot effects (such as undesired oscillations) in the optical response of the FTL. Overshoot effects may occur due to inertia of the FTL when the FTL is driven by a control signal, in particular when the FTL is driven by a non-compensated ("direct") control signal. A direct control signal is a control signal that produces the desired optical response if overshoot effects are neglected. In generating the compensated control signal, the controller takes compensated control signal values applied to the FTL in the past into account. This is based on the insight that not only the current value of the control signal, but also control signals applied to the FTL in a recent past contribute to the optical response of the FTL. Applying the compensated control signal instead of a direct control signal can reduce overshoot effects in the optical response of the FTL.

In an implementation form of the first aspect, the controller is configured to predict a focus of the FTL for the current point in time based on the one or more previous compensated control signal values and to generate the current compensated control signal value based on a difference between the predicted focus and the second focal plane.

The current compensated control signal value can thus be generated in a simple and effective manner. For example, the controller may be configured to translate the difference between the predicted focus and the second focal plane into the current compensated control signal value on the basis of a static one-to-one relationship between the difference between the predicted focus and the second focal plane on the one hand and the current compensated control signal value on the other hand. This one-to-one relationship may be provided, for example, in the form of a look-up table. The one-to-one relationship can be derived in a calibration process, for example, at a factory. The calibration process may include, for example, applying successively various levels of a calibration signal (instead of the compensated control signal) to the FTL, and measuring for each level the resulting focal length (after the FTL has stabilized, that is, after oscillations have decayed).

In a further implementation form of the first aspect, the controller includes a delay buffer element (delay buffer) configured to provide the one or more previous compensated control signal values, and configured to store the current compensated control signal value. Thus an up-to-date recent history of the compensated control signal is provided.

In a further implementation form of the first aspect, the controller includes a codebook element (codebook) configured to store a plurality of sequences of values, each sequence being a model optical response (e.g., a measured optical response) of the FTL for a given control signal difference, and to output a sequence of values based on a difference between the previous compensated control signal and a control signal for a desired optical response of the FTL based on the change of the focus of the FTL from the first focal plane to the second focal plane. The controller also includes a prediction buffer element (prediction buffer) configured to generate a predicted optical response by superposing the output sequence of values onto a sum of previously output sequences of values stored in the prediction buffer element.

The delay buffer, codebook element and prediction buffer operate together to provide a good prediction of the optical response based on a current focal plane change and one or more previous focal plane changes. The codebook element can be implemented as a database of measured optical responses as a function of the control current for the FTL respectively. The prediction buffer can be implemented, for example, as an addition element (adder) that adds the current optical response to previously produced optical responses, to obtain an accurate prediction of an optical response of an FTL based on one or more previous focal changes. The delay buffer serves as a memory of the previous (compensated) control current, to define the desired step function which serves as input for the codebook to output a measured optical response.

In a further implementation form of the first aspect, the controller is further configured to obtain a residual optical response by subtracting the predicted optical response from the desired optical response.

In a further implementation form of the first aspect, the controller is further configured to perform an amplitude inversion of the residual optical response to obtain an inverted residual optical response.

Subtraction of the predicted optical response from the desired optical response and subsequent amplitude inversion provides a compensation signal that annihilates undesirable oscillations in the optical response, when it is added to the desired optical response signal.

In a further implementation form of the first aspect, the controller further includes a first conversion element (first converter) configured to transform the desired optical response into the control signal and a second conversion element (second converter) configured to transform the inverted residual optical response into a compensation signal.

In a further implementation form of the first aspect, the controller is further configured to add the control signal to the compensation signal to form a current compensated control signal.

In a further implementation form of the first aspect, the controller further includes a first normalization element (first normalizer) configured to ensure that the amplitude of the current compensated control signal is within a nominal range.

In a further implementation form of the first aspect, the nominal range is an interval defined by an operating range of the FTL.

In a further implementation form of the first aspect, the controller further includes a second normalization element (second normalizer) configured to ensure that a value of the desired optical response is within an operational range of the FTL.

In a further implementation form of the first aspect, the desired optical response includes a step function, whereby the height of the step is a difference of any two values of a plurality of focal length values.

A second aspect of the present disclosure provides a method for controlling a multifocal display device. The method includes: shifting a focus of a focus tunable lens, FTL, from a first focal plane to a second focal plane by applying a compensated control signal to the FTL. The method includes generating a current compensated control signal value, which is a value of the compensated control signal for a current point in time, based on one or more previous compensated control signal values, which are values of the control signal at one or more previous points in time.

In an implementation form of the second aspect, the method includes storing the compensated control signal as a previous compensated control signal; storing a plurality of sequences of values, each sequence being a pre-measured optical response of the FTL for a given control signal difference, and outputting a sequence of values based on a difference between the previous compensated control signal and a control signal for a desired optical response of the FTL given the change of the focus of the FTL from the second focal plane to a third focal plane; and superposing the output sequence of values onto a sum of all previously output sequences of stored values, to obtain a predicted optical response.

In a further implementation form of the second aspect, the method further includes obtaining a residual optical response by subtracting the predicted optical response from the desired optical response.

In a further implementation form of the second aspect, the method further includes performing an amplitude inversion of the residual optical response to obtain an inverted residual optical response.

In a further implementation form of the second aspect, the method further includes transforming the desired optical response and the inverted residual optical response respectively into the control signal and a compensation signal respectively.

In a further implementation form of the second aspect, the method further includes adding the control signal to the compensation signal to form a current compensated control signal.

In a further implementation form of the second aspect, the method further includes ensuring that the amplitude of the current compensated control signal is within a nominal range.

In a further implementation form of the second aspect, the nominal range is an interval defined by an operating range of the FTL.

In a further implementation form of the second aspect, the method further includes ensuring that a value of the desired optical response is within an operational range of the FTL.

In a further implementation form of the second aspect, the desired optical response includes a step function, whereby the height of the step is a difference of any two values of a plurality of focal length values.

The method of the second aspect achieves the same advantages and effects than the device of the first aspect.

A third aspect of the present disclosure provides a computer program product, which includes a program code for controlling a multifocal display device according to the first aspect or any of its implementation forms.

Accordingly, with the computer program product of the third aspect, the advantages and effects described for the device of the first aspect can be achieved.

Improvements provided by the present disclosure are based, for example, on exploiting the lens control function path. It is focusing on a particular way of generating the optimal lens control signal, which can be stored and accessed by an optical system on demand.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present invention will be explained in the following description of exemplary embodiments in relation to the enclosed drawings, in which.

DETAILED DESCRIPTION

Figure 1:
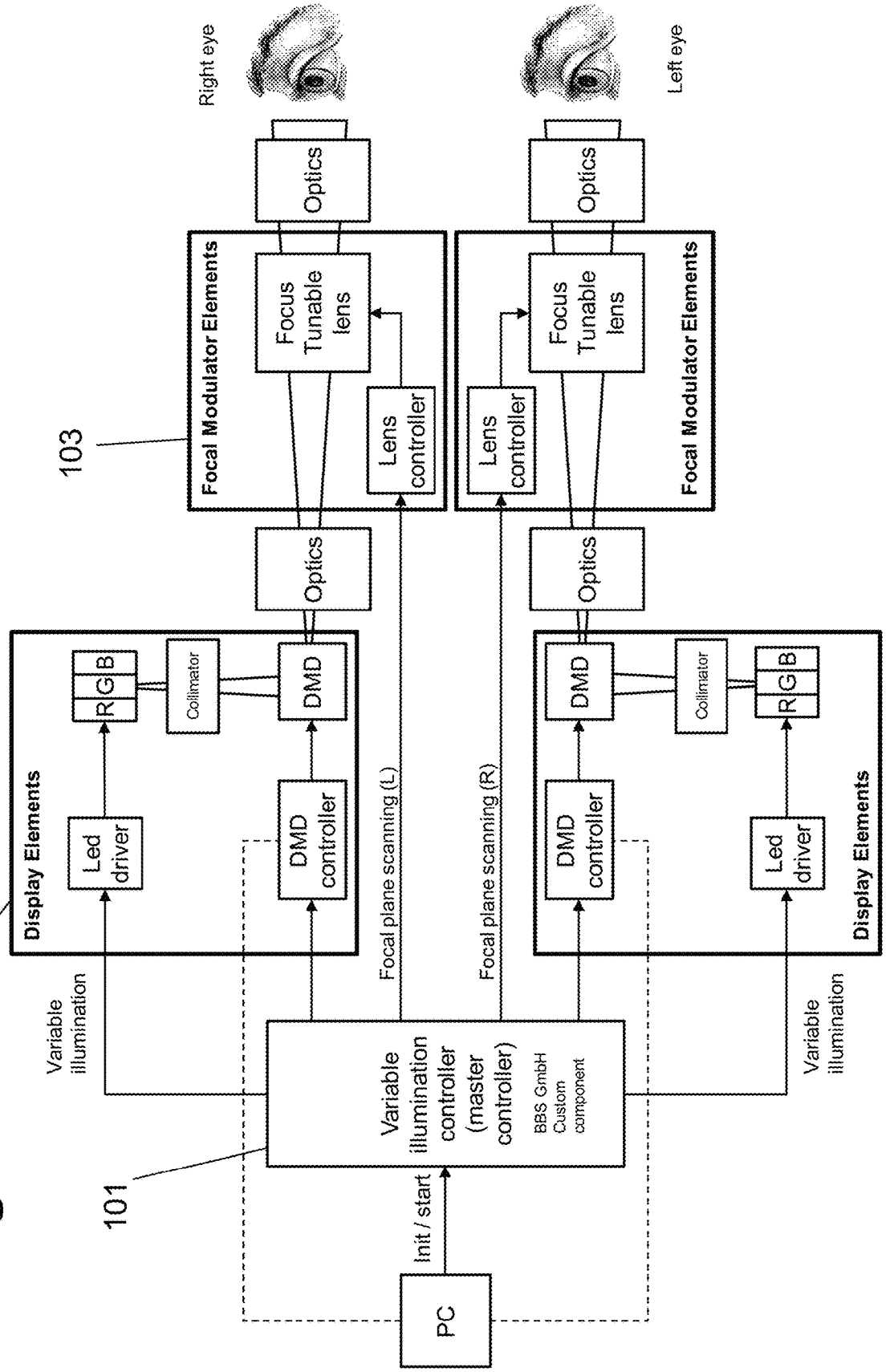
FIG. 1 shows a multifocal display device.

Multifocal plane display (MFD) optical systems are related to Near-eye displays (NED) or Near-to-eye (NTE) applications or devices. An example of such a device 100 is shown in FIG. 1. MFD implementations can be categorized into spatially multiplexed or temporally/time multiplexed techniques. In a time multiplexed system as shown for the device 100 in FIG. 1, the viewing distance of a single 2D display from the eye is rapidly switched in synchronization with the rendering of frames of multiple focal planes to create a flicker-free perception. The device 100 uses ultrafast display elements 102 to sequentially display color images at a flicker fusion threshold speed (>=60 Hz frame rate), e.g., a Digital Micromirror Device (DMD) or Ferroelectric Liquid Crystal on Silicon (FLCoS). High-speed focal modulator (or varifocal) elements 103 use variable power lenses to continuously adjust or modulate the focal length or optical power, e.g., electrically tunable lenses and deformable membrane mirror devices (DMMD). MFD optical systems have been chosen due to their ability to provide a good balance between image quality and ease of implementation while alleviating VAC and enabling true volumetric 3D rendering.

Figure 2:
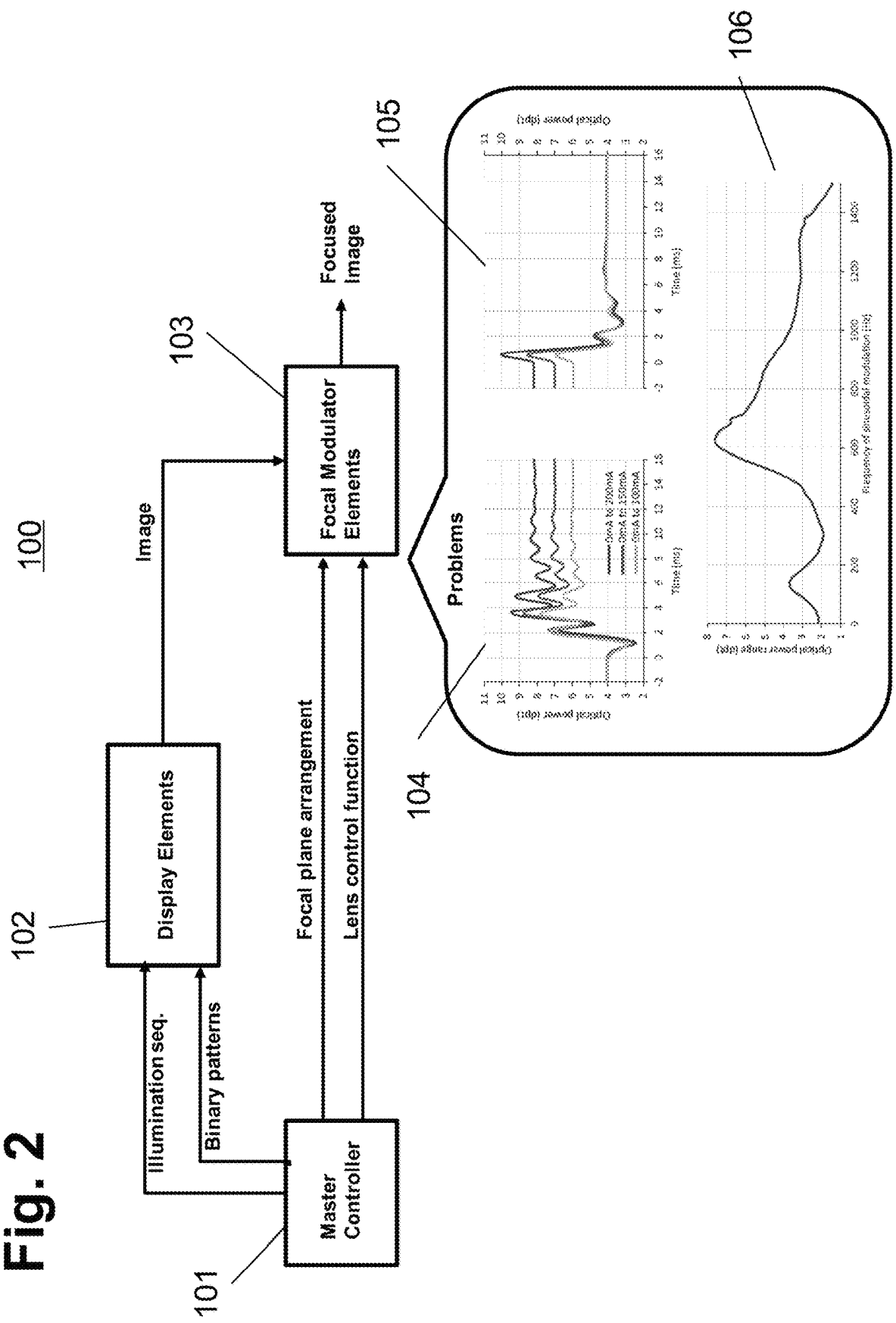
FIG. 2 shows the lens control function path of a multifocal display device.

FIG. 2 shows an example of an MFD device 100 for delivering a focused image for 3D perception. The MFD device 100 includes a Master Controller 101, Display Elements 102 and Focal Modulator Elements 103. The Master controller 101 produces a control signal (e.g, of a certain current intensity) to the Focal Modulator Elements 103, which are utilizing focus tunable lenses (FTL). The optical power of the FTLs is adjusted by the control signal. In order to generate several (e.g., 4) optical power levels (corresponding to, e.g., 4 focal planes), the control signal (e.g., in the form of a current step function) is applied along a lens control function path. Unfortunately, due to lens inertia a significant oscillation artifact (overshoot and ringing) can appear in the optical response of the FTLs. The oscillation artifact is characterized by certain periods of oscillating perturbations like rise and settling times, which occur in a step-up 104 or step-down 105 situation, when the optical power of the FTL needs to be increased 104 or decreased 103 by a certain amount in order to jump to a different focal plane. Depending on the physical properties of the FTL, the FTLs behave like a resonant circuit, which naturally exhibit characteristic resonance frequencies (also known as natural frequencies). These resonance frequencies are visible as peaks in the frequency spectrum 106 of a typical FTL.

Figure 3:
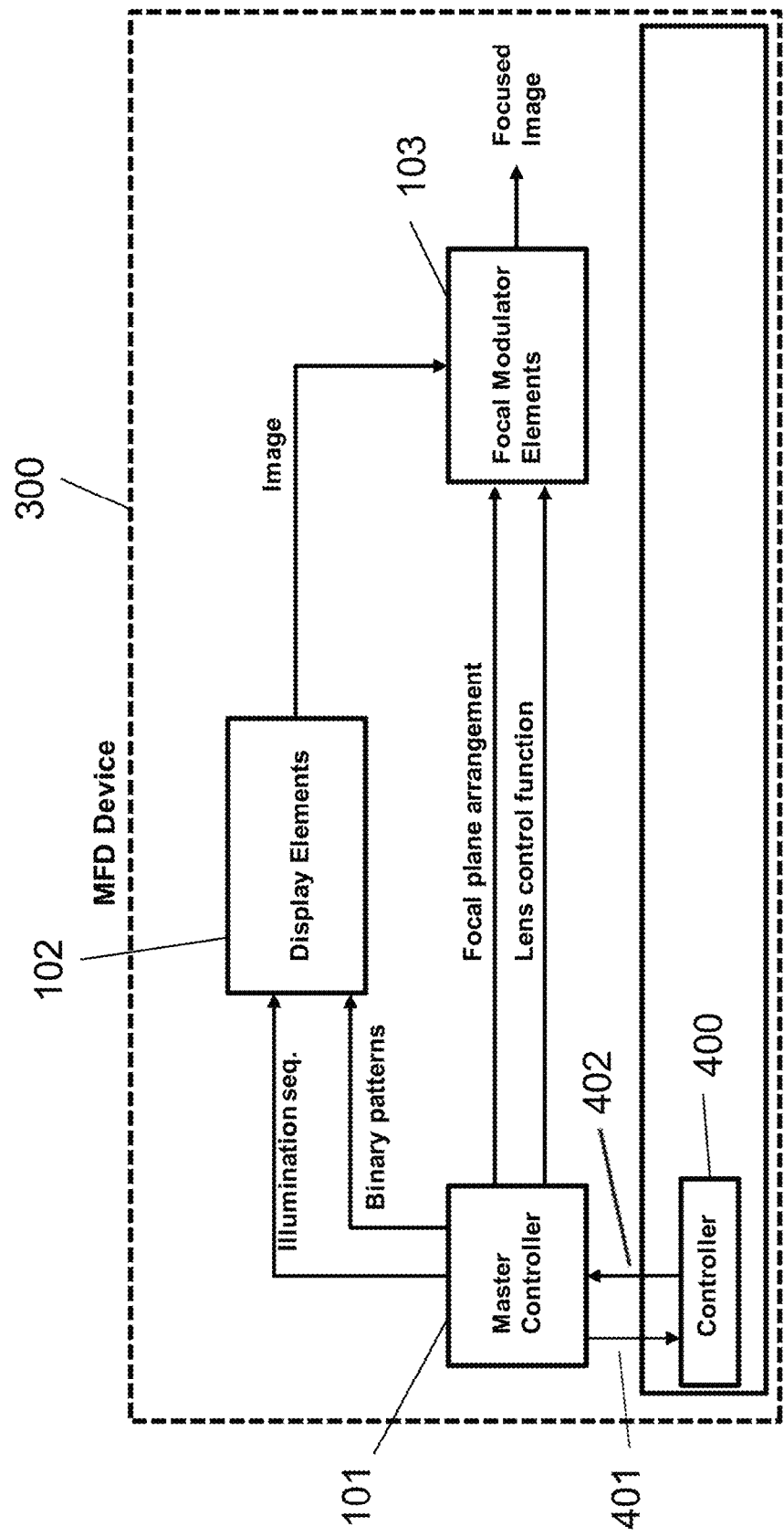
FIG. 3 shows a device according to an embodiment of the present disclosure.

FIG. 3 shows an example of an MFD device 300, which can be seen as an improved version of the device 100 shown in FIG. 1. In the device 300, the desired optical response is used as the input 401 to a controller 400. The controller outputs a compensated control signal 402 as a response in order to minimize oscillations 104 and 105 (see again FIG. 1) of the optical power of the FTL 103 when a focal plane change is triggered. To this end, the controller 400 not only applies signal compensations in response to lens dynamics in the current focal plane change, but also lens dynamics factors in previous focal plane changes, which may still affect the present oscillation state of the FTL 103.

As can be seen in FIG. 2, the settling time for an FTL 103 (i.e., the time it takes until the optical power has reached a quasi-stable state) may be rather long compared to the operating frequencies of interest. For example, the settling time may be about 14 ms, while focal plane changes will occur in a shorter time frame of 4 ms. Therefore, oscillations of the FTL 103 also depend on previous values of the compensated control signal, that is, on the values of the compensated control signal fed to the FTL 103 before the current focal plane change. Considering this effect, the controller 400 is designed to memorize previous optical responses of the FTL 103 to take residual oscillations in the FTL 103 from previous focal plane changes into account. More specifically, the controller 400 adds them up to construct a compensated control signal, so that the compensated control signal when applied to the FTL 103 drives the FTL 103 so as to achieve approximately the desired focal plane change. The desired focal plane change may notably be a step function. In the example of FIG. 2, once the compensated control signal 402 is calculated, it is output to the master controller 101 and used in the lens control function path to accurately control the Focal Modulator Elements (e.g., FTLs 103). Moreover, the compensated control signal 402 is also stored in the Controller 400 to update the memory of previous focal changes for the next focal plane change.

Figure 4:
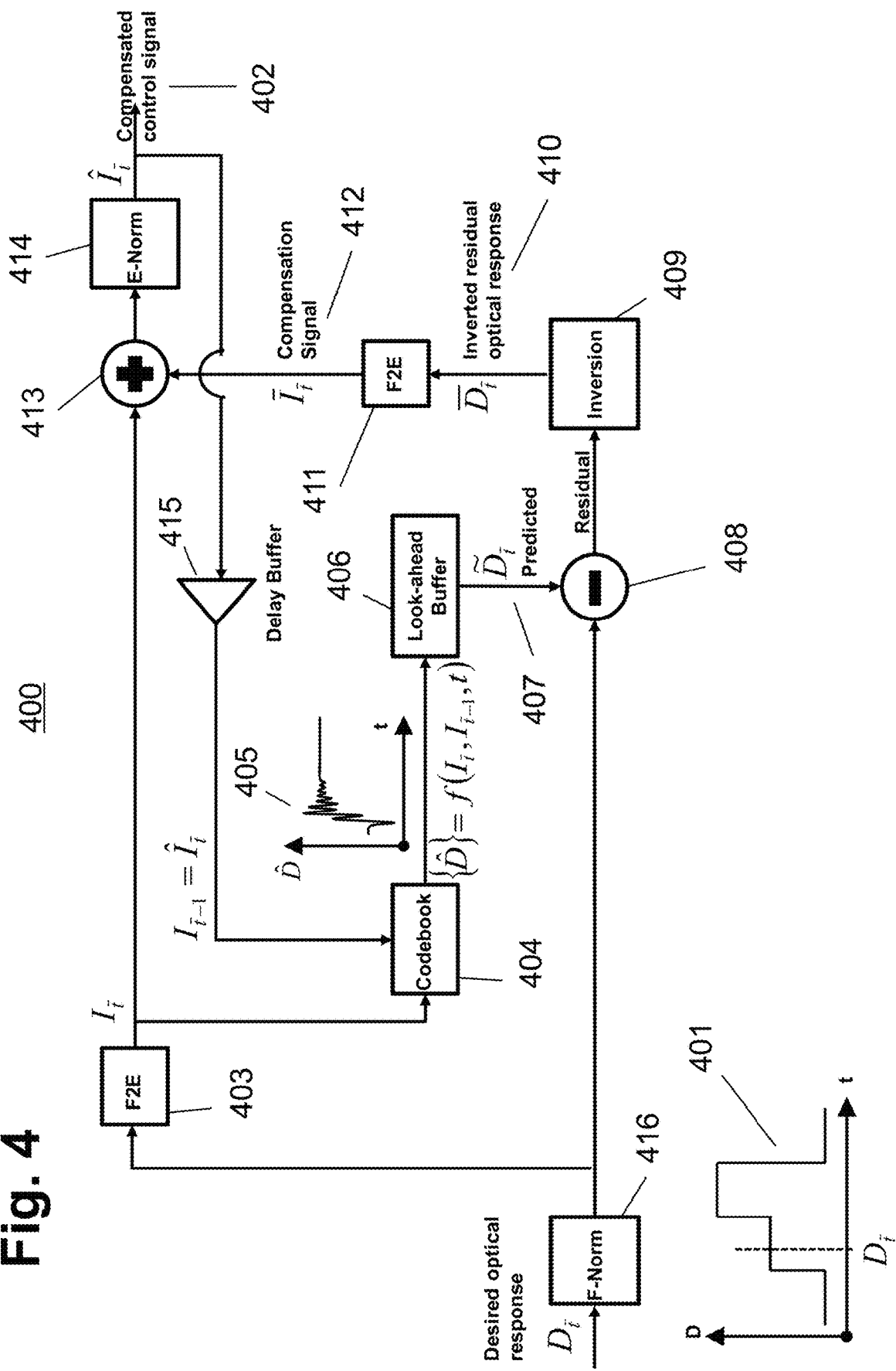
FIG. 4 shows a controller of a device according to an embodiment of the present disclosure.

FIG. 4 shows an example of an implementation form of the controller 400. In the example, the controller 400 produces the compensated control signal 402 in real-time based on previous focal plane changes and the desired focal plane change or desired optical response 401.

For example, at a time $t=\bar{t}$, a desired optical response value $D_{\bar{t}}$ 401 is given. A range normalization through, e.g., an "F-Norm" block 416 may be done to ensure that the desired value is within a given operational range of the lens. The next block is a first "F2E" block 403, which will perform a transformation/conversion from the focal plane domain (optical response D) to the electrical domain (current intensity I) to output a current $I_{\bar{t}}$. The block codebook 404 takes $I_{\bar{t}}$ and a previous value $I_{\bar{t}-1}$ to output a sequence of values $\{\hat{D}\}$, which is based on a measured optical response 405 given the mentioned input values. By this measure, the controller determines the actual step change occurring in the desired optical response function 401. In one particular implementation the system takes the value $I_{\bar{t}}$ and evaluates the difference with respect to the past value $I_{\bar{t}-1}$, and the codebook entries store a variety of optical responses based on the two values $I_{\bar{t}}$ and $\Delta_{\bar{t}} = I_{\bar{t}} - I_{\bar{t}-1}$. For values which are not stored in the codebook, an interpolation may be done based on the nearest stored entries.

In the next block, the Look-ahead buffer 406, the sequence of values $\{\hat{D}\}$ is added to already present values in the Look-ahead buffer 406 starting from the buffer location corresponding to anytime before the time $t=\bar{t}$. This buffer represents a superposition of past optical responses and the current one. Herewith the Look-ahead buffer 406 provides a history of previous optical responses, which contribute to the present optical response due to long-lasting oscillations beyond the typical step change of a few milliseconds.

The particular value of the real optical response determined by the superposition of past optical responses at time $t=\bar{t}$ is then taken as the output $\{\hat{D}_{\bar{t}}\}$. This value is the predicted optical response value 407 at current time $t=\bar{t}$. A "residual" signal is obtained after subtracting 408 the predicted optical response 407 from the desired optical response 401. An amplitude inversion 409 is then performed to obtain the inverted residual optical response $\overline{D}_{\bar{t}}$. This value 410 is then converted to the electrical domain to obtain the compensation signal $\overline{I}_{\bar{t}}$ 412, e.g., by using the second "F2E" block 411, which can be similar or identical to the block 403 mentioned earlier. This value is added 413 to the output signal of the first F2E 403 and subsequently, a normalization is performed by the "E-norm" block 414 to ensure that the amplitude of the final compensated control signal $\hat{I}_{\bar{t}}$ 402 is staying within the nominal or operational range of an focal modulator element, particularly an FTL, e.g., +/−275 mA. The (normalized) compensated control signal 402 is delivered to the Master Controller 101, which uses it to perform a focal step at the FTLs 103 with minimal perturbations in the optical response. Moreover, this output signal 402 is stored in the "Delay buffer" block 415 to be used as a previous value-input for the Codebook 404.

An improved compensation control signal 402 for rapidly shifting the focus of Focal Modulator Elements 103 like FTLs can be generated based on a plurality of previous optical responses due to previous focal plane changes, whose oscillations still contribute to the actual optical response in the FTLs or Focal Modulator Elements 103.

Figure 5:
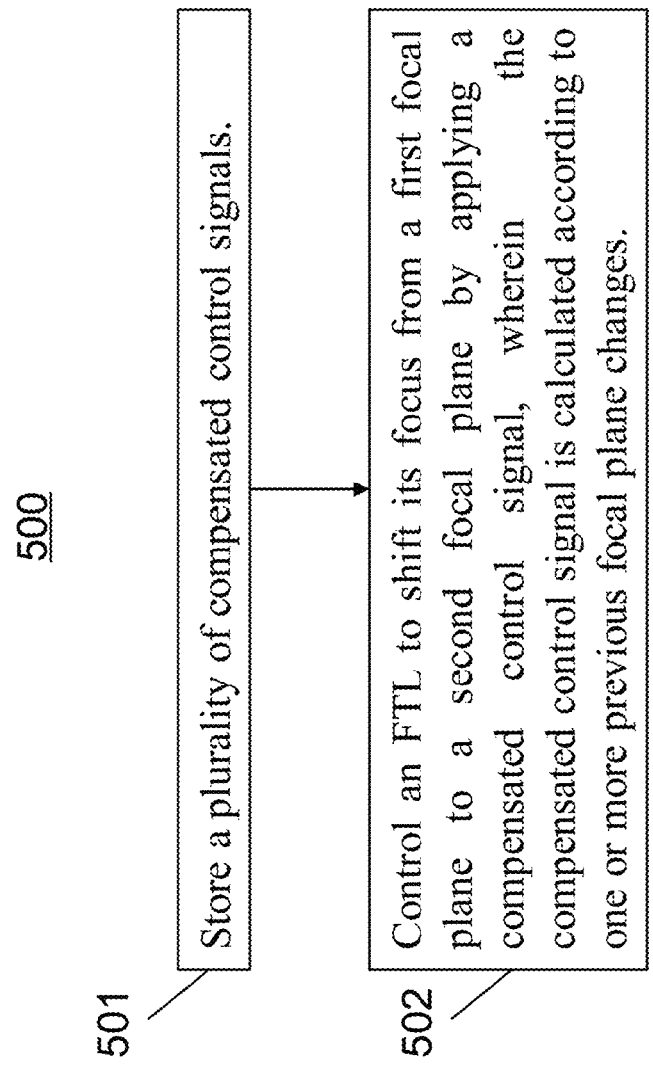
FIG. 5 shows a method according to an embodiment of the present disclosure.

The example of a method 500 illustrated by the flowchart in FIG. 5 includes a step 501 of storing a plurality of compensated control signals 402. The method 500 also includes a step 502 of shifting a focus of a FTL 103 from a first focal plane to a second focal plane with a compensated control signal 402. The compensated control signal is calculated according to one or more previous focal plane changes. The method 500 may be carried out in or by a device 300 shown in FIG. 3.

Variations of the above described embodiments can be devised and implemented without departing from the scope of the claims. In the claims as well as in the description, the verb "comprise" does not exclude further elements or steps and the indefinite article "a" or "an" does not exclude a plurality. A single element or other unit may fulfill the function of several entities or items recited in the claims. The mere fact that certain measures are recited in different claims does not indicate that a combination of these measures cannot be used in an advantageous implementation.

What is claimed is:

1. A multifocal display device comprising:
    a focus tunable lens (FTL); and
    a controller configured to shift a focus of the FTL from a first focal plane to a second focal plane by applying a compensated control signal to the FTL,
    wherein the controller is configured to generate a current compensated control signal value, which is a value of the compensated control signal for a current point in time, based on one or more previous compensated control signal values, which are values of the compensated control signal at one or more previous points in time,
    wherein the controller is further configured to:
        output the compensated control signal at the one or more previous points in time to the FTL and to a compensation feedback loop, the feedback loop providing feedback data comprising the one or more previous compensation control signal values,
        convert a current desired optical response into a current control signal;
        determine a current compensation signal based on the feedback data; and
    add the current control signal to the current compensation signal to generate the current compensated control signal value.

2. The multifocal display device according to claim 1, wherein the controller is configured to:
    predict the focus of the FTL for the current point in time based on the one or more previous compensated control signal values; and
    generate the current compensated control signal value based on a difference between the predicted focus and the second focal plane.

3. The multifocal display device according to claim 1, wherein the controller comprises:
    a delay buffer configured to provide the one or more previous compensated control signal values and configured to store the current compensated control signal value.

4. The multifocal display device according to claim 1, wherein the controller further comprises a normalizer configured to ensure that a value of a desired optical response is within an operational range of the FTL.

5. The multifocal display device according to claim 1, wherein a desired optical response of the FTL comprises a step function, wherein the height of the step is a difference of any two values of a plurality of focal length values.

6. The multifocal display device according to claim 1, wherein the controller is further configured to generate the current compensated control signal value based on the one or more previous compensated control signal values by using a sequence of values that are determined based on a measured optical response for the one or more previous compensated control signal values.

7. A multifocal display device comprising:
a focus tunable lens (FTL); and
a controller configured to shift a focus of the FTL from a first focal plane to a second focal plane by applying a compensated control signal to the FTL,
wherein the controller is configured to generate a current compensated control signal value, which is a value of the compensated control signal for a current point in time, based on one or more previous compensated control signal values, which are values of the compensated control signal at one or more previous points in time, and
wherein the controller comprises:
a codebook, which is configured to store a plurality of sequences of values, each sequence being a model optical response of the FTL for a given control signal difference, and is configured to output a sequence of values based on a difference between the previous compensated control signal and a control signal for a desired optical response of the FTL based on the change of the focus of the FTL from the first focal plane to a second focal plane; and
a prediction buffer configured to generate a predicted optical response by superposing the output sequence of values onto a sum of previously output sequences of values stored in the prediction buffer.

8. The multifocal display device according to claim 7, wherein the controller is configured to obtain a residual optical response by subtracting the predicted optical response from the desired optical response.

9. The multifocal display device according to claim 8, wherein the controller is further configured to perform an amplitude inversion of the residual optical response to obtain an inverted residual optical response.

10. The multifocal display device according to claim 9, wherein the controller further comprises:
a first converter configured to transform the desired optical response into the control signal; and
a second converter configured to transform the inverted residual optical response into a compensation signal.

11. The multifocal display device according to claim 10, wherein the controller is further configured to add the control signal to the compensation signal to form a current compensated control signal.

12. The multifocal display device according to claim 11, wherein the controller further comprises a first normalizer configured to ensure that the amplitude of the current compensated control signal is within a nominal range.

13. The multifocal display device according to claim 12, wherein the nominal range is an interval defined by an operating range of the FTL.

14. A method for controlling a multifocal display device, the multifocal display device comprising a focus tunable lens (FTL), wherein the method comprises:
shifting a focus of the FTL from a first focal plane to a second focal plane by applying a compensated control signal to the FTL; and
generating a current compensated control signal value, which is a value of the compensated control signal for a current point in time, based on one or more previous compensated control signal values, which are values of the control signal at one or more previous points in time;
outputting the compensated control signal at the one or more previous points in time to the FTL and to a compensation feedback loop, the feedback loop providing feedback data comprising the one or more previous compensation control signal values;
converting a current desired optical response into a current control signal;
determining a current compensation signal based on the feedback data; and
adding the current control signal to the current compensation signal to generate the current compensated control signal value.

15. A non-transitory computer readable medium having instructions, which when executed by one or more processors, perform the method for controlling the multifocal display device according to claim 14.

* * * * *